(12) United States Patent
Yamakawa et al.

(10) Patent No.: US 8,316,819 B2
(45) Date of Patent: Nov. 27, 2012

(54) CONTROL OF SPARK IGNITED INTERNAL COMBUSTION ENGINE

(75) Inventors: Masahisa Yamakawa, Hiroshima (JP);
Shinichi Sugihara, Yokohama (JP);
Naohiro Yamaguchi, Hiroshima (JP);
Keiji Araki, Hatsukaichi (JP)

(73) Assignee: Mazda Motor Corporation, Hiroshima (JP)

( * ) Notice: Subject to any disclaimer, the term of this patent is extended or adjusted under 35 U.S.C. 154(b) by 729 days.

(21) Appl. No.: 12/563,054

(22) Filed: Sep. 18, 2009

(65) Prior Publication Data

US 2010/0077989 A1    Apr. 1, 2010

(30) Foreign Application Priority Data

Sep. 26, 2008    (JP) ................. 2008-247540

(51) Int. Cl.
 *F02B 3/00* (2006.01)
 *F02B 5/00* (2006.01)
(52) U.S. Cl. ........ 123/299; 123/305; 123/321; 123/325; 123/481; 123/493; 701/105; 701/110
(58) Field of Classification Search .......... 123/299, 123/300, 320, 321, 324, 325, 481, 493, 198 DB, 123/198 F; 701/103, 104, 105, 110
See application file for complete search history.

(56) References Cited

U.S. PATENT DOCUMENTS

| | | | | |
|---|---|---|---|---|
| 7,370,616 B2 * | 5/2008 | Kuo et al. | ................... | 123/90.15 |
| 7,370,633 B2 * | 5/2008 | Kang et al. | ..................... | 123/305 |
| 7,992,537 B2 * | 8/2011 | Yi et al. | ......................... | 123/295 |
| 2006/0196467 A1 * | 9/2006 | Kang et al. | ..................... | 123/305 |
| 2007/0006831 A1 * | 1/2007 | Leone et al. | ............... | 123/90.15 |
| 2008/0270004 A1 * | 10/2008 | Kuo et al. | ...................... | 701/103 |
| 2009/0150052 A1 * | 6/2009 | Kumano et al. | ............... | 701/103 |
| 2009/0272363 A1 * | 11/2009 | Yun et al. | ....................... | 123/295 |

FOREIGN PATENT DOCUMENTS

| | | |
|---|---|---|
| JP | 2002-332894 | 11/2002 |
| JP | 2008-031948 | 2/2008 |

* cited by examiner

*Primary Examiner* — Willis R Wolfe, Jr.
*Assistant Examiner* — Anthony L Bacon
(74) *Attorney, Agent, or Firm* — Alleman Hall McCoy Russell & Tuttle LLP

(57) ABSTRACT

There is provided, in one aspect of the present description, a method of controlling a spark ignited internal combustion engine having a fuel injector which injects fuel directly into its combustion chamber. The method comprises stopping the fuel injection if a desired torque for the engine is a predetermined torque or less and a speed of the engine is a predetermined speed or greater. The method comprises resuming the fuel injection by injecting a first amount of fuel directly into the combustion chamber during a negative pressure period and injecting a second amount of the fuel into the combustion chamber during an intake period. The method further includes resuming the fuel injection by injecting a third amount of the fuel directly into the combustion chamber during the negative pressure period and injecting a fourth amount of the fuel into the combustion chamber during the intake period.

20 Claims, 8 Drawing Sheets

CONTROL OF SPARK IGNITED INTERNAL COMBUSTION ENGINE

BACKGROUND

The present description relates to control of a spark ignited internal combustion engine having a fuel injector which directly injects fuel into the combustion chamber. It relates more specifically to a resumption of the fuel injection after a fuel shutoff.

It is known and described, for example, in Japanese Patent Application Publication No. 2002-332894 that the fuel injection is shutoff during a vehicle deceleration. The fuel injection is shutoff when the engine speed is a predetermined speed or greater and a desired torque for the engine is a predetermined torque or less that can be detected by detecting that a depression of the accelerator pedal is less than a predetermined value. When the engine speed reaches a predetermined fuel resumption speed during the fuel shutoff, or when the accelerator pedal depression reaches the predetermined value during the fuel shutoff, the fuel injection is resumed.

For decades, gasoline has been almost exclusively used for spark ignited internal combustion engines. In recent years, ethanol is becoming a more popular fuel to be used for spark ignited internal combustion engine as described, for example, in Japanese Patent Application Publication No. 2008-031948. While pure ethanol including one consisting of 97% ethanol and 3% water may be used as fuel, ethanol is usually mixed with gasoline to make fuel such as E10 (10% ethanol and 90% gasoline), E25 and E85.

When the fuel injection is resumed, an in-cylinder temperature is decreased because the combustion has been suspended so that the injected fuel may not evaporate or be atomized well in the combustion chamber. This is especially true when the fuel contains more ethanol since ethanol is less volatile than gasoline. Then, the combustion in the fuel resumption may be instable leading to deterioration of the drivability of the engine.

Therefore, there is room to improve the method to resume the fuel injection to a spark ignited combustion engine.

SUMMARY

Accordingly, there is provided, in one aspect of the present description, a method of controlling a spark ignited internal combustion engine having a fuel injector which injects fuel directly into its combustion chamber. The method comprises stopping the fuel injection if a desired torque for the engine is a predetermined torque or less and a speed of the engine is a predetermined speed or greater. The method comprises resuming the fuel injection by injecting a first amount of fuel directly into the combustion chamber during a negative pressure period which is in a negative valve overlap period that is after an exhaust valve of the combustion chamber is closed and before an intake valve of the combustion chamber is opened in a cylinder cycle and during which a pressure in the combustion chamber is less than a pressure when the exhaust valve is closed and injecting a second amount of the fuel into the combustion chamber during an intake period in which the intake valve of said combustion chamber is opened when the engine speed has decreased to the predetermined speed. The second amount is less than the first amount and includes zero. The method further includes resuming the fuel injection by injecting a third amount of the fuel directly into the combustion chamber during the negative pressure period and injecting a fourth amount of the fuel into the combustion chamber during the intake period when the desired engine torque has increased to the predetermined torque. The third amount is less than the fourth amount and includes zero.

According to the first aspect, when the engine speed has decreased to the predetermined speed, the fuel injection is resumed by injecting the greater amount of fuel during the negative pressure period and the lesser amount of fuel during the intake period. The greater amount of fuel is injected into the combustion chamber during the negative pressure period when the pressure in the combustion chamber is lower and the boiling point of the fuel is lower so that more fuel evaporates or is atomized as soon as the fuel is injected. As a result, less fuel will remain liquid when a spark is made for ignition around a compression top dead center, and more fuel can be combusted after the ignition. Consequently, the combustion can be stabilized enough.

However, the fuel injection during a negative period may cause more fuel to stick to a top of the piston which is positioned closer to the fuel injector. Although it does not matter so much if the desired torque is less and the fuel injection amount is less, it may deteriorate the evaporation or atomization of the injected fuel when the fuel injection amount is greater.

When the desired engine torque has increased to the predetermined torque, the fuel injection is resumed by injecting the lesser amount of the fuel during the negative pressure period and the greater amount of the fuel into the combustion chamber during the intake period. Generally, in a spark ignited internal combustion engine, as the desired engine torque increases, air inducted into the combustion chamber increases and the airflow during an intake stroke increases. The increased airflow can evaporate or atomize more of the fuel injected during the intake stroke. Therefore, also in the case of resuming the fuel injection as a result of the desired engine torque reaching the predetermined torque, the combustion stability can be secured.

Consequently, the method according to the first aspect can stabilize the combustion when the fuel injection is resumed as a result of either the engine speed reaching the predetermined speed or the desired torque reaching the predetermined torque leading to an improvement of the engine drivability.

There is provided, in a second aspect of the present description, a system comprising a spark ignited internal combustion engine, a fuel injector which injects fuel directly into its combustion chamber, and a controller. The controller is configured to control the fuel injector to perform the method according to the first aspect. Therefore, the system according to the second aspect can stabilize the combustion when the fuel injection is resumed as a result of either the engine speed reaching the predetermined speed or the desired torque reaching the predetermined torque leading to an improvement of the engine drivability.

In some embodiments, the first amount may be increased as volatility of the fuel decreases, for example, as ethanol content in the fuel increases, or a temperature of the engine decreases, so as to enhance evaporation of fuel in lower fuel volatility situations and suppress an undue amount of fuel injected when the piston is closer to the fuel injector.

Further, in the embodiments, the negative valve overlap period may be decreased, for example, by opening the intake valve earlier during a cylinder cycle, as the desired engine torque increases so as to induct more fresh air into the combustion chamber for the greater engine torque.

BRIEF DESCRIPTION OF THE DRAWINGS

The advantages described herein will be more fully understood by reading an example of embodiments in which the above aspects are used to advantage, referred to herein as the Detailed Description, with reference to the drawings wherein.

DETAILED DESCRIPTION

Figure 1:
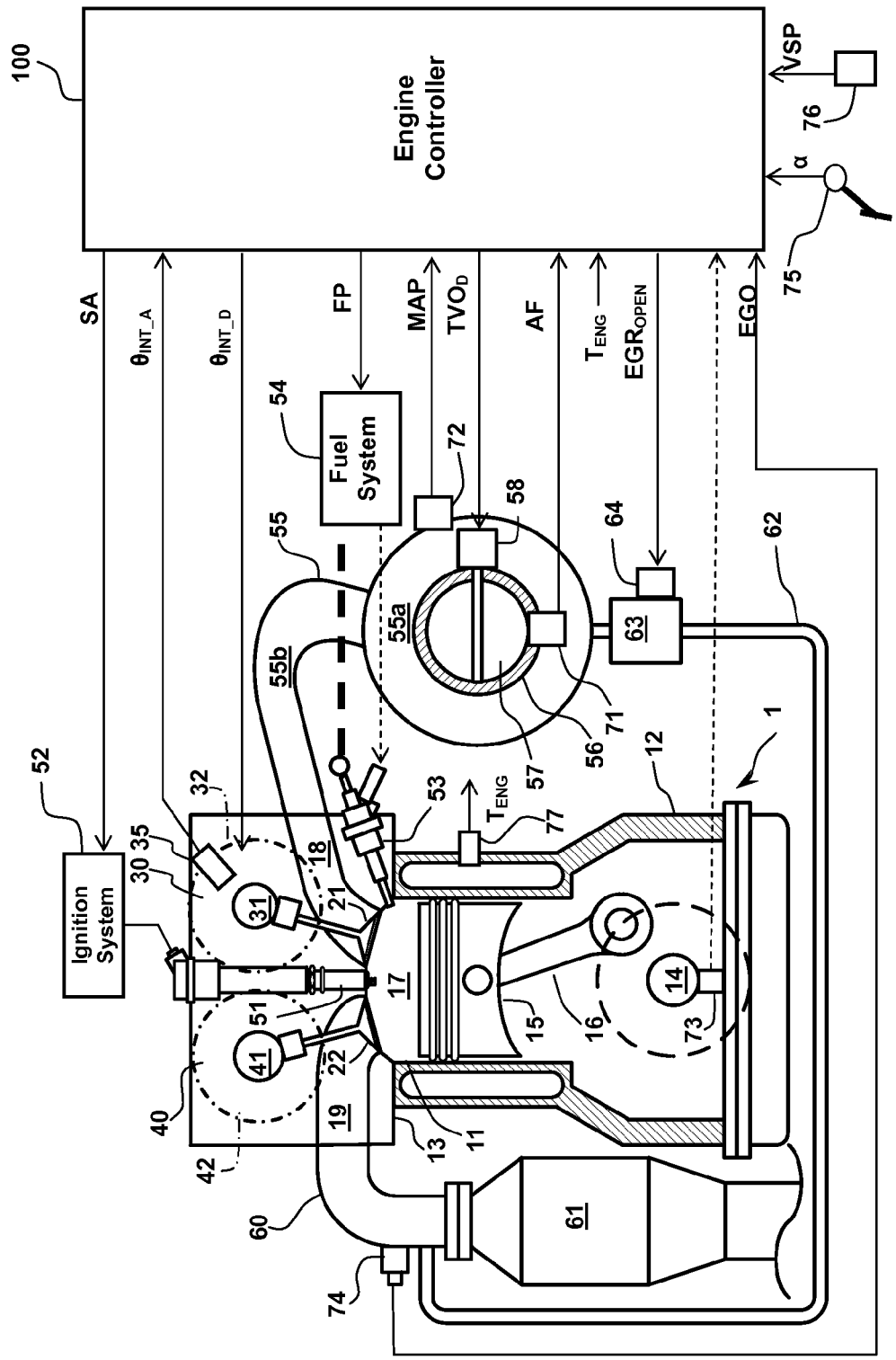
FIG. 1 is a schematic view showing a spark ignition internal combustion engine according to an embodiment of the present description.

Embodiments of the present description will now be described with reference to the drawings, starting with FIG. 1, which illustrates a schematic diagram of an entire engine system having a spark ignited internal combustion engine 1. The engine system includes an engine main body (internal combustion engine) 1 and an engine controller (control module) 100, which is configured to control various actuators associated with the engine main body 1.

The engine main body 1 is a four-cycle spark-ignited internal combustion engine installed in a vehicle, such as an automobile. An output shaft of the engine main body 1 is coupled to a drive wheel via a transmission in order to drive the vehicle. The engine main body 1 includes a cylinder block 12 and a cylinder head 13 placed thereon. Inside the cylinder block 12 and the cylinder head 13, a plurality of cylinders 11 are formed. The number of cylinders 11 is not limited; however, four cylinders 11 are formed in this embodiment, as one example. Further, in the cylinder block 12, a crankshaft 14 is supported rotatably by a journal, a bearing and the like.

To each of the cylinders 11, a piston 15 is slideably inserted and fitted, over which a combustion chamber 17 is laid out.

The cylinder head 13 is formed with two intake ports and two exhaust ports communicating with the respective one of the combustion chambers. In FIG. 1, one intake port 18 and one exhaust port 19 are shown, though two intake ports and two exhaust ports per cylinder are included in this embodiment, as described above. Further, the cylinder head 13 is provided with intake valves 21 blocking the respective intake ports 18 from the combustion chamber 17 and exhaust valves 22 blocking the respective exhaust ports 19 from the combustion chamber 17. The intake valves 21 are driven by an intake valve driving mechanism 30, described later, to open and close the respective intake ports 18 at a predetermined timing. On the other hand, the exhaust valves 22 are driven by an exhaust valve driving mechanism 40 to open and close the respective exhaust ports 19.

The intake valve driving mechanism 30 and the exhaust valve driving mechanism 40 have an intake camshaft 31 and an exhaust camshaft 41, respectively. The intake camshaft 31 and the exhaust camshaft 41 are coupled to the crankshaft 14 via a power transmission mechanism such as a known chain-sprocket mechanism. The power transmission mechanism is configured such that the camshafts 31 and 41 rotate one time while the crankshaft 14 rotates two times.

Further, in the intake valve driving mechanism 30, there is provided an intake camshaft phase changing mechanism 32 between the power transmission mechanism and the intake camshaft 31. The intake camshaft phase changing mechanism 32 is set to change the valve timing of the intake valve 21, in which a phase difference between the crankshaft 14 and the intake camshaft 31 is changed by changing the phase difference between the driven shaft, which is arranged concentrically with the intake camshaft 31 and is directly driven by the crankshaft 14, and the intake camshaft 31.

The intake camshaft phase changing mechanism 32 includes, for example, a hydraulic pressure mechanism where a plurality of liquid chambers are arranged in a circumferential direction between the driven shaft and the intake camshaft 31 and a pressure difference is given between the liquid chambers to change the phase difference, and an electromagnetic mechanism where an electromagnet is provided between the driven shaft and the intake camshaft 31, and the electromagnet is applied with current to change the phase difference. The intake camshaft phase changing mechanism 32 changes the phase difference based on the valve timing of the intake valve 21 calculated by the engine controller 100, described later.

In this embodiment, the intake camshaft phase changing mechanism 32 changes the valve opening timing IVO and valve closing timing IVC of the intake valve 21 by changing the phase difference while the lift amount (i.e., a valve profile of the intake valve 21) is kept constant. A phase angle of the intake camshaft 31 is detected by a cam phase sensor 35, and a signal $\theta_{INT\_A}$ thereof is transmitted to the engine controller 100.

Also, in the exhaust valve driving mechanism 40, there is provided an exhaust camshaft phase changing mechanism 42 between the power transmission mechanism and the intake camshaft 41. The exhaust camshaft phase changing mechanism changes the valve opening timing EVO and valve closing timing EVC of the exhaust valve 22 in the same manner as in the intake camshaft phase changing mechanism.

The intake port 18 communicates with a surge tank 55a via an intake manifold 55b. The air intake passage upstream of the surge tank 55a is provided with the throttle body (throttle valve actuator) 56. A throttle valve 57 is pivotally provided inside the throttle body 56 for adjusting the intake flow volume flowing from the external to the surge tank 55a. The throttle valve 57 can change the opening area of the air intake passage (i.e., the flow passage area) to change the intake flow volume, and the pressure in the air intake passage downstream of the throttle valve 57. The throttle valve 57 is actuated by a throttle valve actuator 58. The throttle valve actuator 58 actuates the throttle valve 57 such that the opening TVO of the throttle valve 57 is to be a target throttle valve opening $TVO_D$ calculated in the engine controller 100. Here, the air intake passage 55 may include all of the intake port 18, the intake manifold 55b and the surge tank 55a downstream of the throttle valve 57. In this embodiment, an amount of air to be inducted into the cylinder 11, that is, the air charge amount CE inside the cylinder 11, is controlled to have an adequate value by adjusting the opening of the throttle valve 57 and the closing timing of the intake valve 21.

The exhaust port 19 communicates with an exhaust pipe via an exhaust manifold 60. In the exhaust pipe, an exhaust gas treatment system is arranged. A specific constitution of the exhaust gas treatment system is not limited to, but may include those having a catalytic converter 61 of a three-way catalyst, a lean $NO_x$ catalyst, an oxidation catalyst and the like.

The surge tank 55a and the exhaust manifold 60 communicate with each other via an EGR pipe 62, constituted such that a part of the exhaust gas is circulated to an intake side. Provided in the EGR pipe 62 is an EGR valve 63 for adjusting the flow volume of EGR gas circulating to the intake side through the EGR pipe 62. The EGR valve 63 is actuated by an EGR valve actuator 64. The EGR valve actuator 64 actuates the EGR valve 63 such that the opening of the EGR valve 63 becomes an EGR opening $EGR_{open}$ calculated by the engine controller 100. This makes it possible to adjust the flow volume of the EGR gas to an adequate value.

The cylinder head 13 has spark plugs 51 attached thereto such that a tip of each spark plug faces the combustion chamber 17. The spark plug 51 generates a spark in the combustion chamber 17 when supplied with current by an ignition system 52, based on an ignition timing signal SA output from the engine controller 100, described later in detail.

Further, the cylinder head 13 has fuel injectors 53 attached thereto for injecting fuel directly into the respective combustion chambers 17 such that a tip of each of the fuel injectors faces the combustion chamber 17. In more detail, the fuel injector 53 is arranged such that the tip thereof is positioned below the two intake ports 18 in a vertical direction, and midway between the two intake ports 18 in a horizontal direction. The fuel injector 53 injects a predetermined amount of fuel into the combustion chamber 17 when a solenoid coupled to the fuel injector 53 is supplied with current by a fuel system 54 for a predetermined period of time based on a fuel pulse signal FP calculated by and output from the engine controller 100.

The engine controller 100 is a controller having a known microcomputer as a base and includes a CPU for executing a program, a memory such as RAM and ROM for storing a program and data, and an I/O bus for inputting and outputting various signals.

The engine controller 100 receives inputs via the I/O bus, with various information such as an intake airflow AF detected by an air flow meter 71, an air pressure MAP inside the surge tank 55a detected by an intake pressure sensor 72, a crank angle pulse signal detected by a crank angle sensor 73, an oxygen concentration EGO of the exhaust gas detected by an oxygen concentration sensor 74, an amount α of depression of an accelerator pedal by a driver of the automobile detected by an accelerator pedal position sensor 75, a vehicle speed VSP detected by a vehicle speed sensor 76, and an engine temperature $T_{ENG}$ detected by an engine coolant temperature sensor 77. Then, the engine controller 100 calculates control parameters for various actuators such that the air charge amount, ignition timing and the like in the cylinder 11 may be an appropriate value according to the operating conditions based on the input information. For example, the control parameters such as a throttle valve opening TVO, the fuel injection amount FP, the ignition timing SA, a target value of the intake valve timing $\theta_{INT\_D}$ and the EGR opening $EGR_{open}$ are calculated and output to the throttle valve actuator 58, the fuel system 54, the ignition system 52, the intake camshaft phase changing mechanism 32, the EGR valve actuator 64 and the like.

Control routines the engine controller 100 executes will be described with reference to flowcharts illustrated in FIGS. 2 and 3.

Figure 2:
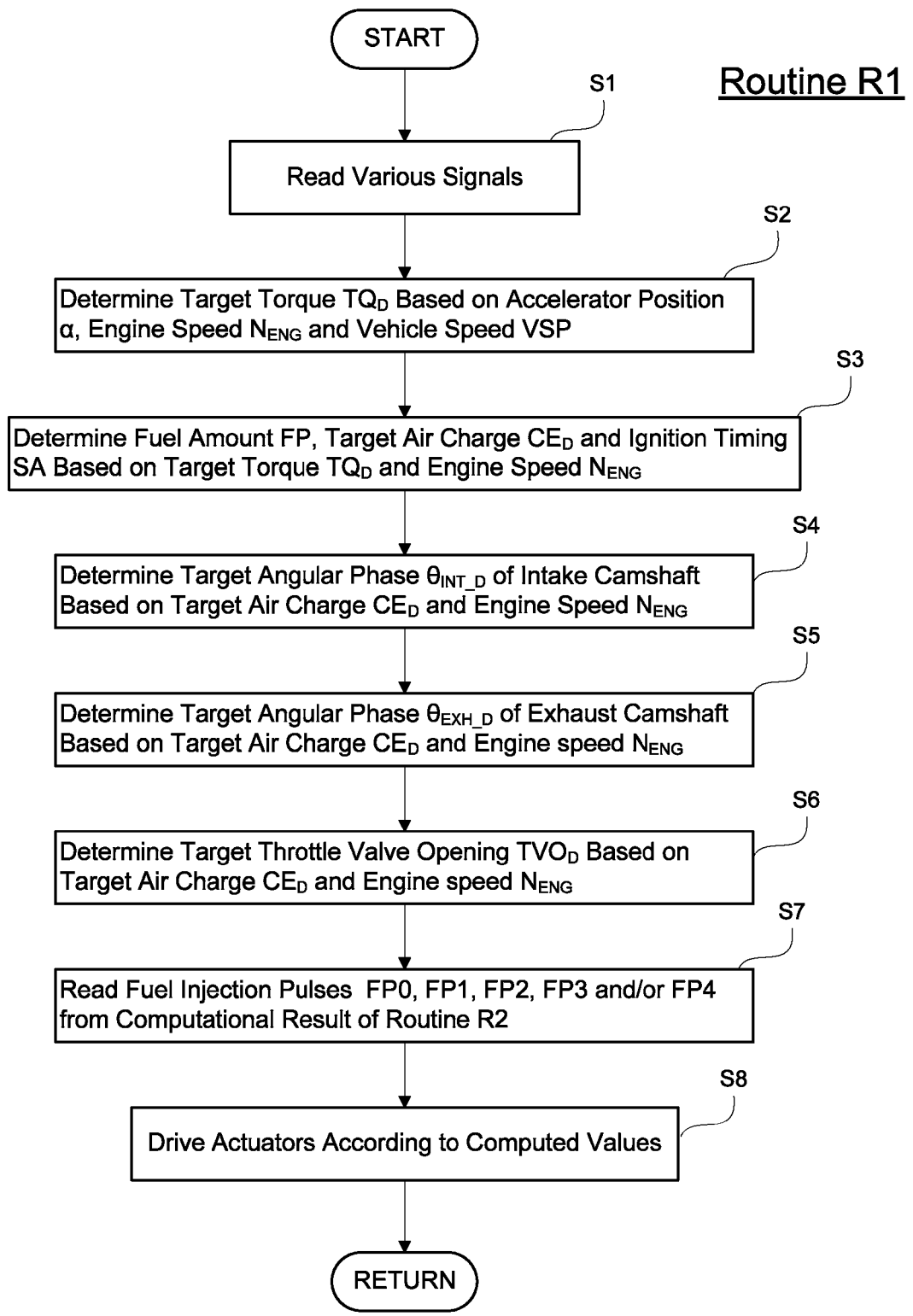
FIG. 2 shows a flowchart of routine R1 executed by an engine controller 100 of FIG. 1.

Referring to FIG. 2, there is shown a flowchart of a first routine R1 for the engine controller 100 to input and output signals with the various devices described above. After the start, at step S1, the first routine R1 reads various signals such as the accelerator position α. It proceeds to step S2 and determines a target torque $TQ_D$ based on the accelerator pedal position α, the engine speed $N_{ENG}$ of the engine 1 (calculated from the crank angle pulse signal) and the vehicle speed VSP. After step S2, it proceeds to step S3 and determines a fuel amount FP, a target air charge $CE_D$ (a target value of the air charge amount CE in the cylinder 11) and an ignition timing SA based on the target torque $TQ_D$ and engine speed $N_{ENG}$. The fuel amount FP and target air charge $CE_D$ are determined to increase as the target torque $TQ_D$ increases.

Figure 4:
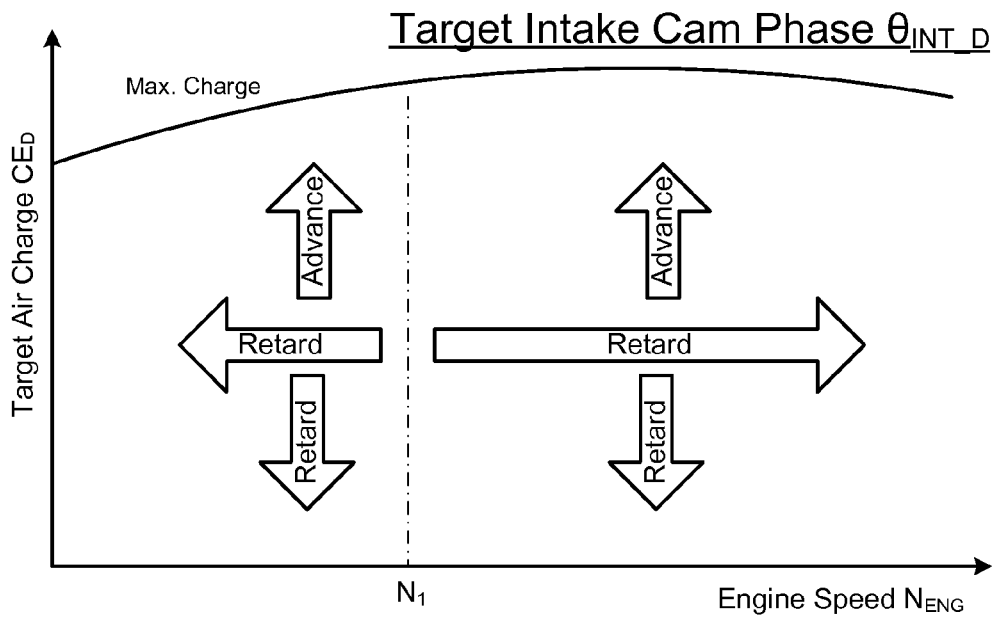
FIG. 4 shows a diagram illustrating a target phase of an intake camshaft phase adjusting mechanism 32 of FIG. 1.

Then, the first routine R1 proceeds to step S4 and determines a target angular phase $\theta_{INT\_D}$ of the intake camshaft 31 based on the target air charge $CE_D$ and the engine speed $N_{ENG}$ determined in step S3 by reading data in a table expressed by a map illustrated in FIG. 4. Therein, the target angular phase $\theta_{INT\_D}$ of the intake camshaft 31 is set to retard as the engine speed $N_{ENG}$ increases when it is greater than a predefined speed N1. In contrast, when the engine speed $N_{ENG}$ is less than the predefined speed N1, the target angular phase $\theta_{INT\_D}$ retards as the engine speed decreases.

On the other hand, as the target air charge $CE_D$ increases, the target angular phase $\theta_{INT\_D}$ advances. At a higher target charge $CE_D$ the intake valve 21 closes at a timing IVC1 as illustrated in the second top diagram of FIG. 7 while at a lower target air charge $CE_D$ the intake valve closes at a timing IVC2 which is later than the timing IVC1 in a cylinder cycle as illustrated in the second bottom diagram of FIG. 7. As a result, at the timing IVC2 the piston is substantially ascended and the air which has been inducted into the combustion chamber 17 is blown back to the intake air passage 18. Therefore, the lower target air charge in the combustion chamber 17 is obtained without substantially closing the throttle valve 57, which causes lower pressure to act on the top of the piston 15 during the intake stroke leading to pumping loss.

After step S4, the first routine R1 proceeds to step S5 and determines a target angular phase $\theta_{EXH\_D}$ of the exhaust camshaft 41 based on the target air charge $CE_D$ and the engine speed $N_{ENG}$ determined in step S3. The target angular phase $\theta_{EXH\_D}$ of the exhaust camshaft 41 changes much less than that of the intake camshaft 31. As a result, in one exemplary state where the target air charge $CE_D$ is relatively high and engine speed $N_{ENG}$ is relatively high, as shown in a region labeled "Positive" in a map illustrated in FIG. 5, the exhaust valve 22 opens at a timing EVO1 before the bottom dead center and closes at a timing EVC1 after the top dead center during a cylinder cycle as shown in the second top diagram of FIG. 7. In this state, the intake valve 21 opens at a timing IVO1 before the top dead center and closes at a timing IVC1 after the bottom dead center during the cylinder cycle. Therefore, the intake valve 21 opens at the timing IVO1 which is before the timing EVC1 at which the exhaust valve 22 closes. Consequently, there is between the timings IVO1 and EVC1 a time in which the both intake valve 21 and the exhaust valve 22 are opened, which is an overlap period.

Figure 5:
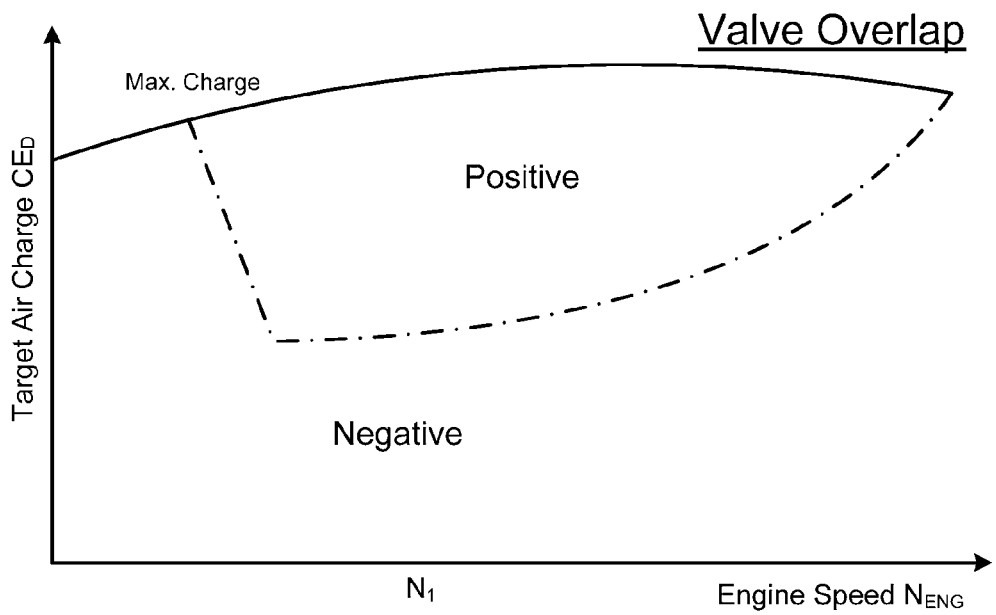
FIG. 5 shows a diagram illustrating a valve overlap profile between intake and exhaust valves 21 and 22 of FIG. 1.
Figure 7:
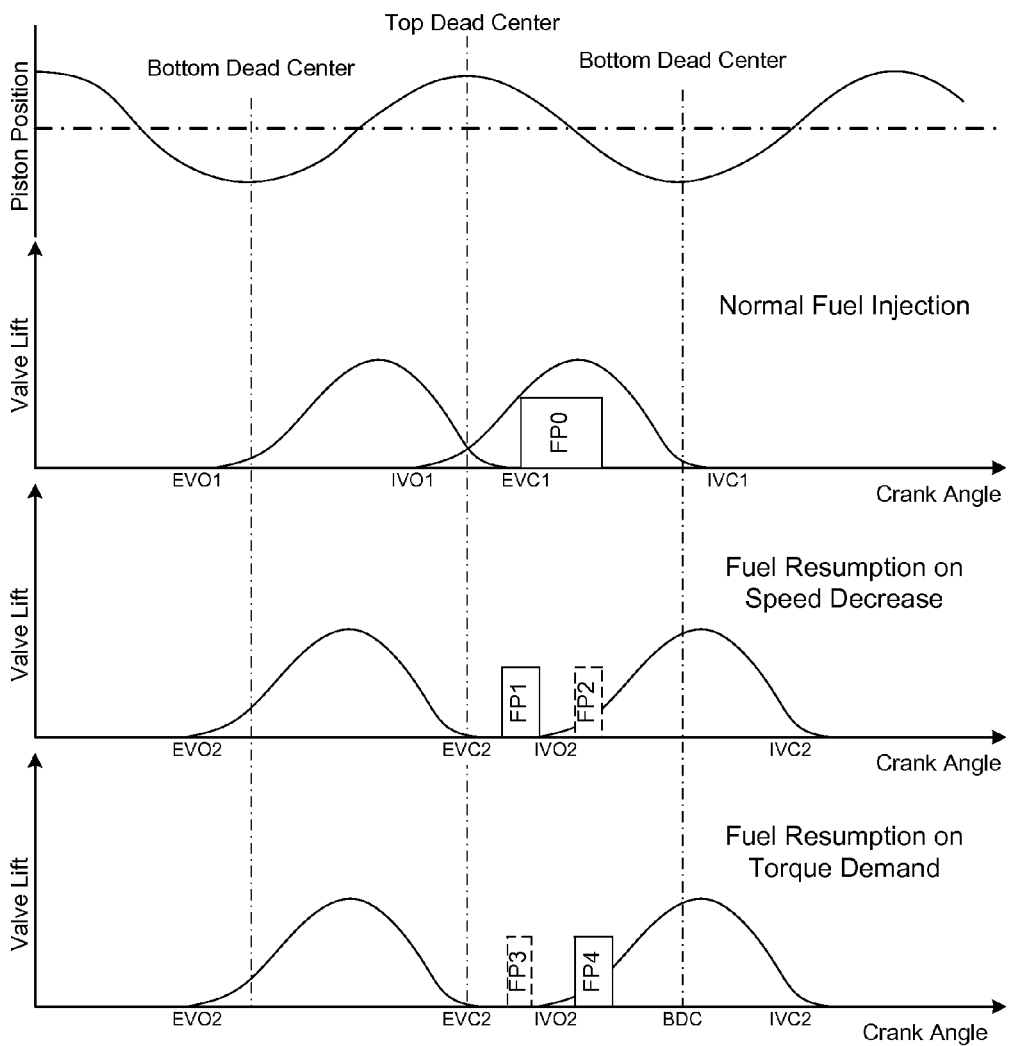
FIG. 7 shows diagrams illustrating states of operation of the intake valve, exhaust valve and fuel injection in accordance with the embodiment.

In another exemplary state where the target air charge $CE_D$ and engine speed $N_{ENG}$ is not in the Positive region but in a region labeled "Negative" in the map of FIG. 5, the exhaust valve opens at a timing EVO2 before the bottom dead center and closes at a timing EVC2 after the top dead center during a cylinder cycle, as shown in second bottom and bottom diagrams of FIG. 7. In this state, the intake valve 21 opens at a timing IVO2 after the top dead center and closes at a timing IVC2 after the bottom dead center during the cylinder cycle. Therefore, the intake valve 21 opens at the timing IVO2 which is after the timing EVC2 at which the exhaust valve 22 closes. Consequently, there is between the timings EVC2 and IVO2 a time in which the both intake valve 21 and the exhaust valve 22 are closed, which is a negative overlap period.

Referring back to FIG. 2, the first routine R1 proceeds to step S6 and determines a target throttle valve opening $TVO_D$ as a target value of the opening TVO of the throttle valve 57 based on the target air charge $CE_D$ and the engine speed $N_{ENG}$. Then, it proceeds to step S7 and reads pulse widths FP0, FP1, FP2, FP3 and/or FP4 of the fuel injection during a cylinder cycle from a computational result of a second routine R2 described in greater detail below.

After step S7, the first routine R1 proceeds to step S8 and drives the respective actuators according to the computed control parameters such as the fuel injection amount FP, the ignition timing SA, the target intake camshaft phase $\theta_{INT\_D}$, and the target throttle valve opening $TVO_D$. Specifically, the signal $\theta_{INT\_D}$ is outputted to the intake camshaft phase changing mechanism 32. Then, the intake camshaft phase changing mechanism 32 operates such that a phase of the intake camshaft 31 relative to the crankshaft 14 has a value corresponding to $\theta_{INT\_D}$. The signal $TVO_D$ is outputted to the throttle valve actuator 58. Then, the throttle valve actuator 58 operates such that the opening TVO of the throttle valve 57 has a value corresponding to $TVO_D$. The signals FP0, FP1, etc. are outputted to the fuel system 54. Then, the signal SA is outputted to the ignition system 52. The spark plug 51 is ignited and an air-fuel mixture is ignited in the combustion chamber 17 at a timing corresponding to SA in the cylinder cycle. This causes the air-fuel mixture, including the required amount of air and fuel, to be ignited and burned at an appropriate timing such that the target torque, determined mainly from the accelerator position α, is generated from the engine 1. After step S8, the first routine R1 returns.

Figure 3:
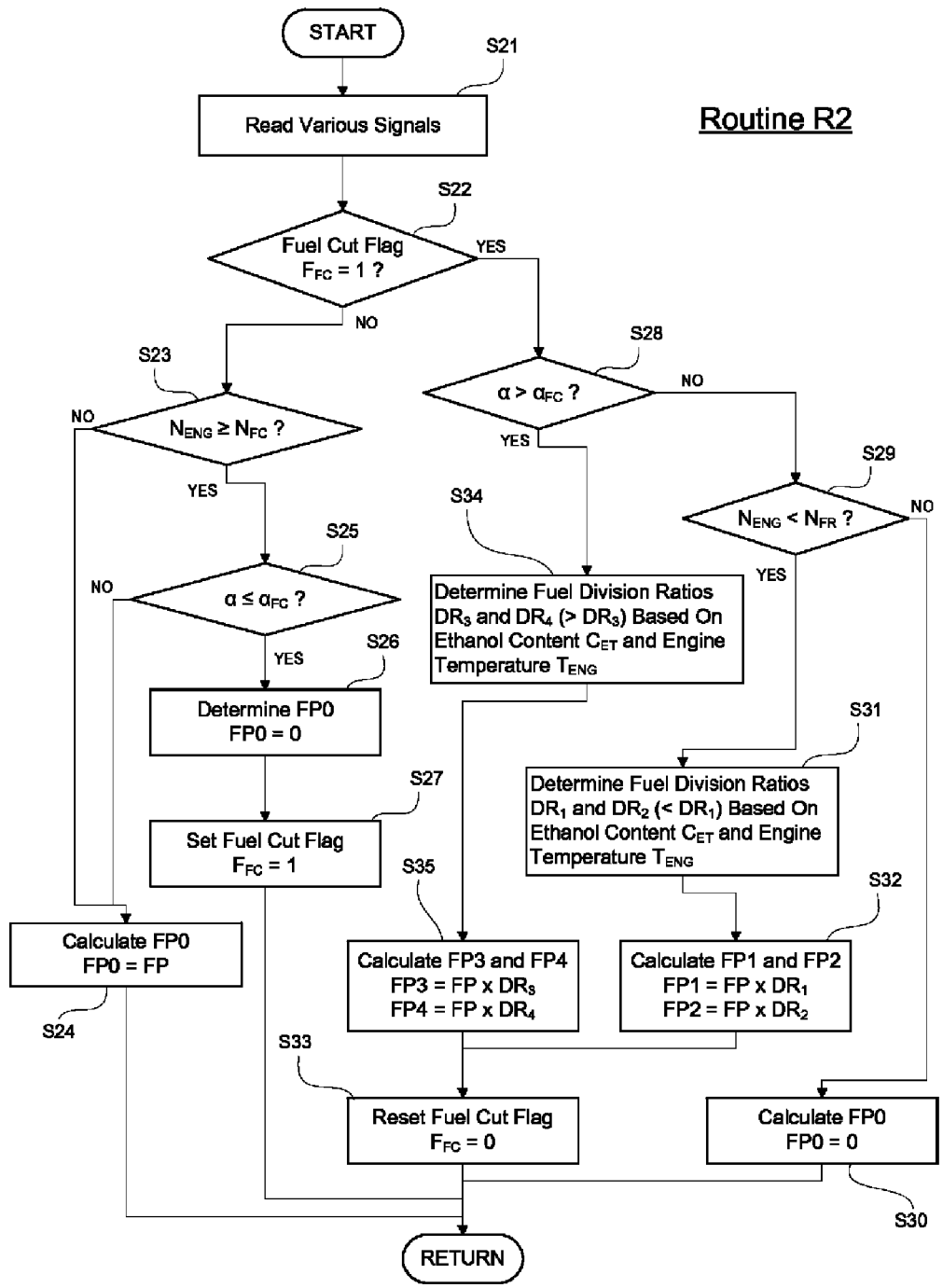
FIG. 3 shows a flowchart of routine R2 executed by the engine controller 100 of FIG. 1.

Referring to FIG. 3, there is shown a flowchart illustrating the second routine R2 which is executed for computing the fuel injection pulse widths FP0, FP1, FP2, FP3 and/or FP4 that are read at step S7 of the first routine R1.

After the start, the second routine R2 proceeds to step S21 and various signals are read. Then, it proceeds to step S22 and determines whether or not a fuel cut flag $F_{FC}$ is set. If it is determined NO at step S22, the second routine R2 proceeds to step S23 and determines whether or not the engine speed $N_{ENG}$ is a fuel cut speed $N_{FC}$, for example 1000 rpm, or greater. If it is determined NO at step S23, the second routine R2 proceeds to step S24 and calculates a one time fuel pulse width FP0 to be equal to the fuel injection amount FP which is determined at step S3 of the first routine R1, and the second routine R2 returns. Then, the other fuel pulse widths FP1 through FP4 remain zero. At step S8 of the first routine R1, the fuel injector 53 is driven to open its nozzle at a predefined timing after the intake valve 21 opens and to close it when the pulse width FP0 has passed as illustrated in the second from the top diagram of FIG. 7. Therefore, the fuel injector 53 injects fuel during the intake stroke during a cylinder cycle.

When it is determined at step S23 that the engine speed $N_{ENG}$ is the fuel cut speed $N_{FC}$ or greater (YES), the second routine R2 proceeds to step S25 and determines whether or not the accelerator position α is a fuel cut position $\alpha_{FC}$ or less. If it is determined NO at step S25, the second routine R2 proceeds to step S24, and it returns.

When it is determined at step S25 that the accelerator position a is the fuel cut position $\alpha_{FC}$ or less (YES), the second routine R2 proceeds to step S26 and calculates the one-time fuel pulse width FP0 to be zero. Then, it proceeds to step S27 and returns. Then, the fuel injector 53 is not driven to open its nozzle at step S7 of the first routine R1.

On the other hand, when it is determined at step S22 that the fuel cut flag $F_{FC}$ is set (YES), in other words, when fuel injection is shut off, the second routine R2 proceeds to step S28 and determines whether or not the accelerator position a is greater than the fuel cut position $\alpha_{FC}$. If it is determined NO at step S28, the second routine proceeds to step S29 and determines whether or not the engine speed $N_{ENG}$ is less than a fuel resumption speed $N_{FR}$ that is lower than the fuel cut speed $N_{FC}$ and set, for example 900 rpm. If NO at step S29, the second routine R2 proceeds to step S30 and calculates the one-time fuel pulse width FP0 to be zero, in other words, the fuel shut off continues.

When it is determined at step S29 that the engine speed $N_{ENG}$ is less than the fuel resumption speed $N_{FR}$ (YES), the second routine R2 proceeds to step S31 and determines first and second fuel division ratios $DR_1$ and $DR_2$ under a condition as expressed by an equation below based on an ethanol content $C_{ET}$ in the fuel and the engine temperature $T_{ENG}$ detected by the engine coolant temperature sensor 77:

$$DR_1 + DR_2 = 1.$$

The ethanol content $C_{ET}$ is derived from the fuel injection pulse FP and the oxygen concentration in the exhaust gas detected by the exhaust gas oxygen sensor 74 as is known in the art. The first and second fuel division ratios $DR_1$ and $DR_2$ are determined in accordance with tables stored in the memory of the engine controller 100 and illustrated as maps in FIGS. 8 and 9.

After step S31, the second routine R2 proceeds to step S32 and calculates first and second fuel pulse widths FP1 and FP2 as described below:

$$FP1 = FP \times DR_1$$

$$FP2 = FP \times DR_2.$$

Then, since $DR_1 + DR_2 = 1$ and FP1+FP2=FP, the other fuel pulse widths FP0, FP3 and FP4 remain zero.

At step S8 of the first routine R1, the fuel injector 53 may be driven to open its nozzle at a predefined timing after the exhaust valve 22 is closed and before the intake valve 21 opens and to close it when the first pulse width FP1 has passed and/or to open its nozzle at a predetermined timing after the intake valve 21 opens and to close it when the second pulse width FP2 has passed as illustrated in the second from the bottom diagram of FIG. 7. After step S32, the second routine proceeds to step S33 and resets the fuel cut flag $F_{FC}$, and then, it returns.

Therefore, the fuel injector 53 injects fuel corresponding to the pulse FP1 between the timings EVC2 and IVO2 or during the negative overlap period and injects fuel corresponding to the pulse FP2 between the timings IVO2 and IVC2 or during the intake stroke for a cylinder cycle of each cylinder. From the next cylinder cycle of each cylinder, the fuel injector 53 injects fuel during the intake stroke as described above.

When it is determined at step S28 that the accelerator position α is greater than the fuel cut position $\alpha_{FC}$ (YES), the second routine R2 proceeds to step S34 and determines third and fourth fuel division ratios $DR_3$ and $DR_4$ under a condition as expressed by an equation below based on the ethanol content $C_{ET}$ in the fuel and the engine temperature $T_{ENG}$ detected by the engine coolant temperature sensor 77:

$$DR_3 + DR_4 = 1.$$

Figure 8:
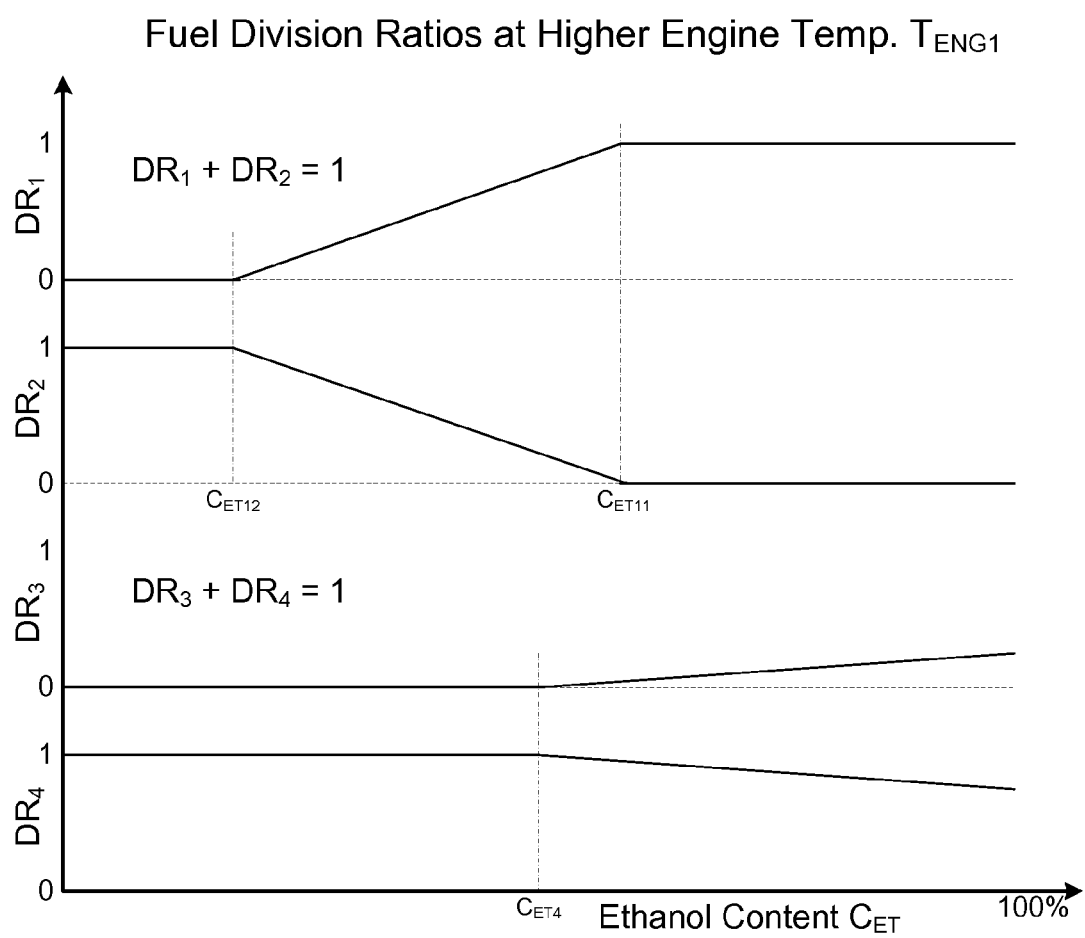
FIG. 8 shows diagrams illustrating fuel division ratios at a higher engine temperature in accordance with the embodiment.
Figure 9:
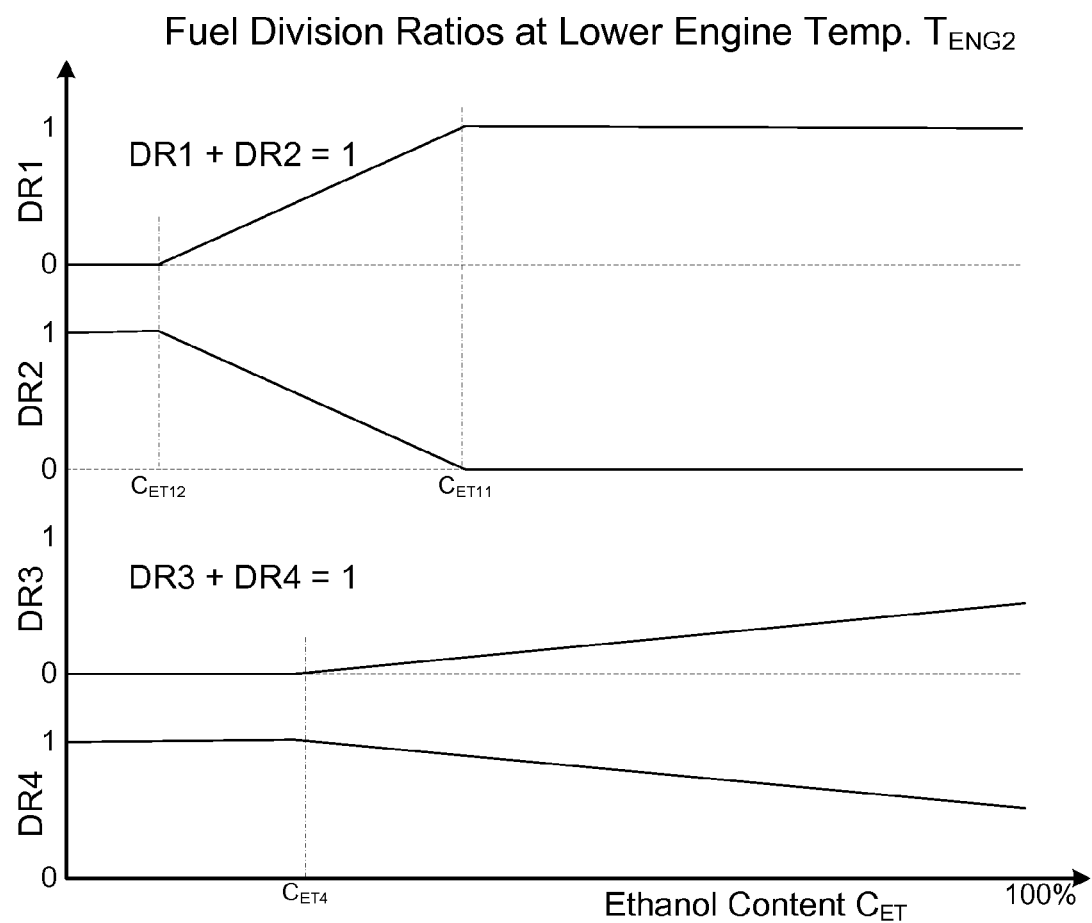
FIG. 9 shows diagrams illustrating fuel division ratios at a lower engine temperature in accordance with the embodiment.

The third and fourth fuel division ratios $DR_3$ and $DR_4$ are determined in accordance with tables stored in the memory of the engine controller 100 and illustrated as maps in FIGS. 8 and 9.

After step S34, the second routine R2 proceeds to step S35 and calculates third and fourth fuel pulse widths FP3 and FP4 as described below:

$$FP3 = FP \times DR_3$$

$$FP4 = FP \times DR_4.$$

Then, since $DR_3 + DR_4 = 1$ and $FP3 + FP4 = FP$, the other fuel pulse widths FP0, FP1 and FP2 remain zero. At step S8 of the first routine R1, the fuel injector 53 may be driven to open its nozzle at a predefined timing after the exhaust valve 22 is closed and before the intake valve 21 opens and to close it when the third pulse width FP3 has passed and/or to open its nozzle at a predetermined timing after the intake valve 21 opens and to close it when the fourth pulse width FP4 has passed as illustrated in the bottom diagram of FIG. 7. After step S35, the second routine proceeds to step S33, and it returns.

Therefore, the fuel injector 53 injects fuel corresponding to the pulse FP3 between the timings EVC2 and IVO2 or during the negative overlap period and injects fuel corresponding to the pulse FP4 between the timings IVO2 and IVC2 or during the intake stroke for a cylinder cycle of each cylinder. From the next cylinder cycle of each cylinder, the fuel injector 53 injects fuel during the intake stroke as described above.

Figure 6:
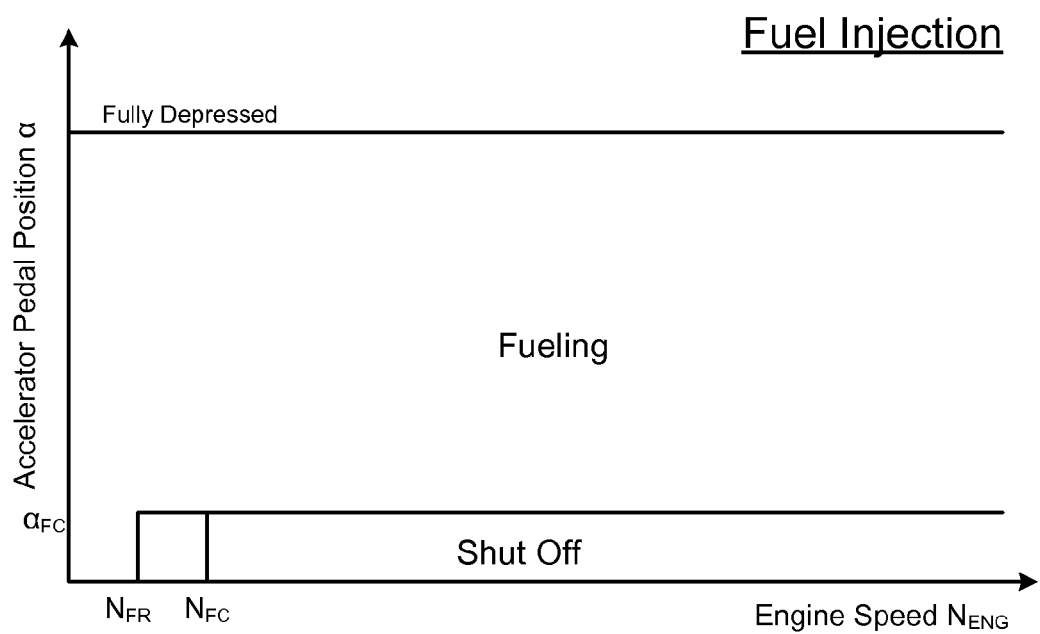
FIG. 6 shows an operational map of fuel injection in accordance with the embodiment.

As is illustrated in FIG. 6, the fuel injection is stopped when the accelerator pedal position α falls below the fuel cut position $\alpha_{FC}$ if the engine speed $N_{ENG}$ is greater than the fuel cut speed $N_{FC}$ in accordance with steps S22, S23, S25 and S26 of the second routine R2.

After the fuel injection is stopped, as long as the accelerator pedal position α is not greater than the fuel cut position $\alpha_{FC}$ and the engine speed $N_{ENG}$ does not fall beyond the fuel resumption speed $N_{FR}$ that is lower than the fuel cut speed $N_{FC}$ as shown in FIG. 6, the fuel injection is kept shut off in accordance with steps S28, S29 and S30 of the second routine R2.

When the engine speed $N_{ENG}$ falls beyond the fuel resumption speed $N_{FR}$ during the fuel shutoff, the fuel injector 53 injects the first amount of fuel corresponding to the first pulse width FP1 after the piston 15 descends beyond its position in the axial direction of the cylinder 11 where the exhaust valve 22 closes at EVC2 and before the intake valve 21 opens at IVO2 as illustrated in the second bottom diagram of FIG. 7. Therefore, the first amount of fuel is injected when a pressure in the cylinder is lower than a pressure when the exhaust valve 22 is closed, and the injected fuel is more likely to evaporate than when the in-cylinder pressure is higher.

As illustrated in the top two graphs of FIG. 8 or 9, the first and second fuel division ratios $DR_1$ and $DR_2$ are set to one and zero respectively when the ethanol content $C_{ET}$ is greater than a value predefined in dependence on the engine temperature $T_{ENG}$. In other words, the first amount FP1 is equal to the total fuel injection amount FP. Therefore, the whole amount of fuel is injected during the negative pressure period, and the lower in-cylinder pressure enhances evaporation of less volatile ethanol fuel.

At an ethanol content $C_{ET11}$ predefined in dependence on the engine temperature $T_{ENG}$, the first fuel division ratio $DR_1$ starts to decrease as the ethanol content $C_{ET}$ decreases. Then, it reaches at zero at an ethanol content $C_{ET12}$ predefined value in dependence on the engine temperature $T_{ENG}$. When the first fuel division ratio $DR_1$ is zero, the second fuel division ratio $DR_2$ is 1, and the whole amount of fuel is injected during the intake stroke of a cylinder cycle.

As can be seen from the comparison between FIGS. 8 and 9, the predefined ethanol contents $C_{ET11}$ and $C_{ET12}$ are set lower as the engine temperature $T_{ENG}$ decreases. As a result, the first amount of fuel injected during the negative pressure period decreases as the ethanol content decreases or the engine temperature becomes higher. Therefore, undue fuel injected during the negative pressure period when the fuel injector 53 is closer to the piston 15 is suppressed.

When the accelerator pedal position α exceeds the fuel cut position $\alpha_{FC}$ during the fuel shutoff, the fuel injector 53 may inject the third amount of fuel corresponding to the third pulse width FP3 after the piston 15 descends beyond its position in the axial direction of the cylinder 11 where the exhaust valve 22 closes at EVC2 and before the intake valve 21 opens at IVO2 as illustrated in the bottom diagram of FIG. 7. Therefore, the third amount of fuel may be injected when a pressure in the cylinder is lower than a pressure when the exhaust valve 22 is closed, and the fourth amount of fuel is injected during the intake stroke of a cylinder cycle.

As illustrated in the bottom two graphs of FIG. 8 or 9, the third and fourth fuel division ratio $DR_3$ and $DR_4$ are set to zero and one respectively when the ethanol content $C_{ET}$ is less than a value $C_{ET4}$ predefined in dependence on the engine temperature $T_{ENG}$. In other words, the fourth amount FP4 is equal to the total fuel injection amount FP. Therefore, the whole amount of fuel is injected during the intake stroke.

When the ethanol content $C_{ET}$ is greater than the value $C_{ET4}$, the third division ratio $DR_3$ increases and the fourth division ratio DR4 increases as the ethanol content $C_{ET}$ increases. When the ethanol content of the fuel is 100%, the third amount of fuel corresponding to the fuel pulse width FP3 is some part of the total fuel amount FP which is less than a half at most.

As can be seen from the comparison between FIGS. 8 and 9, the predefined ethanol content $C_{ET4}$ are set lower as the engine temperature $T_{ENG}$ decreases. As a result, the third amount of fuel injected during the negative pressure period decreases as the ethanol content decreases or the engine temperature becomes higher. Therefore, undue fuel injected during the negative pressure period when the fuel injector 53 is closer to the piston 15 is suppressed.

It is needless to say that the invention is not limited to the illustrated embodiments, nor is the invention limited to the various improvements described herein. Therefore, alternative designs are possible without departing from the substance of the invention as claimed in the attached claims, as described below.

Although injection of the first or third amount of fuel corresponding to the first or third fuel pulse width FP1 or FP2 is completed before the intake valve 21 opens in FIG. 7, it may be slightly after the intake valve 21 opens as long as the start of the injection is during the negative pressure period.

It should be understood that the embodiments herein are illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

The invention claimed is:

1. A method of controlling a spark ignited internal combustion engine having a fuel injector which injects fuel directly into its combustion chamber, comprising:
   stopping the fuel injection if a desired torque for said engine is a predetermined torque or less and a speed of said engine is a predetermined speed or greater;
   resuming the fuel injection by injecting a first amount of fuel directly into said combustion chamber during a negative pressure period which is a part of a negative valve overlap period that is after an exhaust valve of said combustion chamber is closed and before an intake valve of said combustion chamber is opened in a cylinder cycle and during which a pressure in said combustion chamber is lower than a pressure when said exhaust valve is closed and injecting a second amount of the fuel into said combustion chamber during an intake period in which said intake valve of said combustion chamber is opened when the engine speed has decreased to said predetermined speed, said second amount being less than said first amount and including zero; and resuming the fuel injection by injecting a third amount of the fuel directly into said combustion chamber during the negative pressure period and injecting a fourth amount of the fuel into said combustion chamber during the intake period when the desired engine torque has increased to said predetermined torque, said third amount being less than said fourth amount and including zero.

2. The method as described in claim 1, further comprising increasing said first amount as volatility of the fuel decreases.

3. The method as described in claim 2, further comprising determining ethanol content in said fuel, and determining the fuel is less volatile when the determined ethanol content is greater.

4. The method as described in claim 3, further comprising increasing said first amount as a temperature of said internal combustion engine decreases.

5. The method as described in claim 4, further comprising decreasing said negative valve overlap period as the desired engine torque increases.

6. The method as described in claim 5, further comprising opening said intake valve earlier during a cylinder cycle as the desired engine torque increases.

7. The method as described in claim 2, further comprising increasing said first amount as a temperature of said internal combustion engine decreases.

8. The method as described in claim 7, further comprising increasing said negative valve overlap period as the desired engine torque decreases.

9. The method as described in claim 8, further comprising opening said intake valve later during a cylinder cycle as the desired engine torque decreases.

10. The method as described in claim 1, further comprising increasing said first amount as a temperature of said internal combustion engine decreases.

11. The method as described in claim 10, further comprising increasing the negative valve overlap period as the desired engine torque decreases.

12. The method as described in claim 11, further comprising opening said intake valve later during a cylinder cycle as the desired engine torque decreases.

13. The method as described in claim 1, further comprising increasing said first amount as a temperature of said internal combustion engine decreases.

14. The method as described in claim 13, further comprising opening said intake valve later during a cylinder cycle as the desired engine torque decreases.

15. The method as described in claim 14, further comprising closing said intake valve later during a cylinder cycle as the desired engine torque decreases.

16. The method as described in claim 1, further comprising opening said intake valve earlier during a cylinder cycle as the desired engine torque decreases.

17. A system comprising:
a spark ignited internal combustion engine;
a fuel injector which injects fuel directly into its combustion chamber; and
a controller configured to control said fuel injector to:
stop the fuel injection if a desired torque for said engine is a predetermined torque or less and a speed of said engine is a predetermined speed or greater;
resume the fuel injection by injecting a first amount of fuel directly into said combustion chamber during a negative pressure period which is a part of a negative valve overlap period that is after an exhaust valve of said combustion chamber is closed and before an intake valve of said combustion chamber is opened in a cylinder cycle and during which a pressure in said combustion chamber is less than a pressure when said exhaust valve is closed and injecting a second amount of the fuel into said combustion chamber during an intake period in which said intake valve of said combustion chamber is opened when the engine speed has decreased to said predetermined speed, said second amount being less than said first amount and including zero; and
resume the fuel injection by injecting a third amount of the fuel directly into said combustion chamber during the negative pressure period and injecting a fourth amount of the fuel into said combustion chamber during the intake period when the desired engine torque has increased to said predetermined torque, said third amount being less than said fourth amount and including zero.

18. The system as described in claim 17, wherein said controller is further configured to control said fuel injector so that said first amount increases as volatility of the fuel decreases.

19. The system as described in claim 17, further comprising a valve lift adjusting mechanism which changes the negative valve overlap period, and wherein said controller is further configured to control said valve lift adjusting mechanism so that the negative valve overlap period increases.

20. The system as described in claim 19, wherein said controller is further configured to control said valve lift adjusting mechanism so that said intake valve opens later during a cylinder cycle as the desired engine torque decreases.

* * * * *